Jan. 4, 1966   H. G. MASRELIEZ   3,227,785
METHOD OF CASTING CONCRETE
Filed Feb. 19, 1963

INVENTOR.
HANS GUSTAF MASRELIEZ
BY
Young & Thompson
ATTYS

United States Patent Office 3,227,785
Patented Jan. 4, 1966

3,227,785
METHOD OF CASTING CONCRETE
Hans Gustaf Masreliez, Vallingby, Sweden, assignor to Byggnadsfirman Ohlsson & Skarne AB, Hagersten, Sweden, a corporation of Sweden
Filed Feb. 19, 1963, Ser. No. 259,535
Claims priority, application Sweden, Feb. 22, 1962, 1,933/62
6 Claims. (Cl. 264—71)

This invention relates to a method of casting concrete in which the completely cast concrete body comprises a skeleton of stone with the pieces of stone abutting each other and with the voids between the pieces of stone filled with cement mortar.

In accordance with a previously known method of casting concrete bodies, of the kind referred to, the mold is first filled with stone. Subsequently an intake at the bottom of the mold is connected to a concrete pump and cement mortar is forced into the mold. This cement mortar is forced through the layer of stone until the mold is completely filled. This method has a plurality of disadvantages. Thus the cement mortar rising through the layer of stone has a tendency to dry little by little. As a result, the voids between the pieces of stone are not always completely filled. Furthermore, the pieces of stone in the mold will arrive at their abutting positions in a dry state and, in spite of vibration, a low degree of compact mass of the layer of stone and a comparatively small amount of volume of stone in the mold will be obtained. The known method further requires a certain correlation of the pieces of stone as to size and configuration. This requirement as to quality of stone increases the cost of the final product. A contributing factor is the necessity to use expensive pump devices, housings and valves which demand careful attendance and daily cleaning.

The present invention has for its primary object to provide a method of casting concrete, which method eliminates the above named disadvantages and renders possible effective lubrication of the individual pieces of stone during the casting operation without the necessity of complicated and expensive pump equipment, resulting in a considerably higher degree of compactness with consequent increase of the amount of stone as compared with the previously known method. The final product obtained is a concrete body having an extreme constancy of volume and a considerably improved edge stability. A further advantage consists in the possibility of using standard shingle, of a size approximating 17–33 mm., produced in a conventional manner which, together with the fact that special pump equipment is not necessary, results in a considerable saving as compared with the previously known method.

In its broadest aspect, the method, according to the present invention, consists in filling a mold simultaneously with cement mortar and pieces of stone, the ratio of the amount of cement mortar to the amount of stone being such that the level of the cement mortar is always higher than the level of the layer of stone in the mold, whereby the pieces of stone applied sink through, and are lubricated by, the cement mortar. An alternative method is characterized by first pouring cement mortar into the mold, pouring stone into the mold upon the cement mortar, and then pouring additional cement mortar substantially simultaneously together with additional stone in a manner such that the level of cement mortar is always higher than the level of the increasing layer of stone in the mold. During the filling operation, an excess of cement is maintained such that the pieces of stone will sink through a layer of cement.

Figure 1:
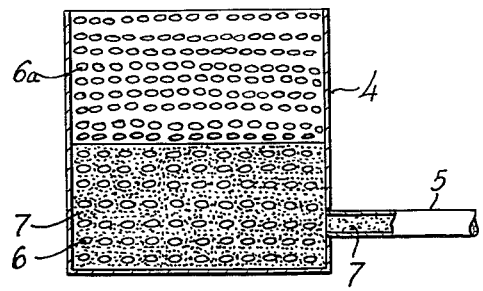
FIG. 1 illustrates a known method of casting concrete.

According to the known method of casting concrete (FIG. 1), a mold 4 which, at its lower part, is provided with a connection duct 5, communicating with a concrete pump of any suitable and known construction (not shown), is first entirely filled with pieces of stone 6 in a dry state. Subsequently, cement mortar 7 is pumped into the mold through the connecting duct 5 until the level of the cement mortar rises to a point entirely filling the mold. After vibration in any suitable and known manner a small amount of stone 6a and cement mortar is added.

Figure 2:
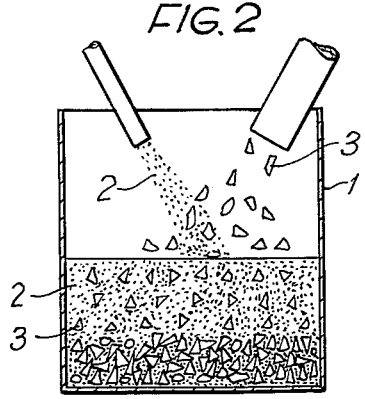
FIG. 2 illustrates a method of casting concrete in accordance with the present invention.

The method of casting concrete, in accordance with the present invention (FIG. 2), comprises the mold 1 being simultaneously or substantially simultaneously filled with cement mortar 2 and pieces of stone 3, the ratio of the amount of cement mortar to the amount of stone being such that the level of the cement mortar is always higher than the level of the layer of stone.

In accordance with the present invention, any suitable means for introducing the cement mortar 2, generally designated by the reference character 8, and any suitable and known means for introducing the stone pieces 3, generally designated by the reference character 9, are provided. As pointed out above, the ratio of cement mortar to stone pieces is such that the level of cement mortar is always higher than that of the layer of stone. This may be determined and accomplished in any suitable manner.

A modification of the method according to the present invention comprises first pouring cement mortar 2 into the mold 1 and then pouring additional cement mortar substantially simultaneously together with additional pieces of stone in such a manner that the level of the cement mortar 2 always lies above the level of the layer of stone 3.

In both methods, the filling operation is preferably combined with vibration, the latter being provided in any suitable and known manner.

In order to improve the lubricating of the pieces of stone as they pass through the cement mortar 2 on their way down to the increasing layer of stone 3 already present in the mold, a peptizing and fluidifying agent may be added, in any suitable and well known manner, to the cement mortar 2. This agent contributes to a faster progress of the pieces of stone 3 through the cement mortar 2.

The cement mortar is also preferably activated in a suitable and well known activator before filling. If desired, both cement mortar 2 and pieces of stone 3 may be spread in layers. This can be accomplished by pouring onto a layer of cement mortar 2 and pieces of stone 3 one or more additional similar layers in such a manner that the level of the mortar 2 always is higher than the level of the layer of stone.

The weight ratio between water and cement in the cement mortar can be 1:2 or 4:5, or some suitable value therebetween. The weight ratio between cement and sand can be 1:2 or 2:3, or some suitable value therebetween. The method according to the present invention is especially suitable in casting precast concrete elements for any building purpose.

After reading the foregoing detailed description of the preferred method of the present invention, it will be understood that the objects set forth at the outset of this specification have been successfully achieved.

What is claimed is:
1. A method of casting precast concrete structural elements comprising pouring from different sources of supply fine viscous paste cement mortar and gravel into a mold, maintaining the ratio of cement mortar to gravel such that the level of cement mortar is higher than the level of gravel, and vibrating the mold to cause the gravel to sink through and become lubricated by the layer of cement mortar so as to obtain in the mold a mix having great compactness of gravel.

2. A method of casting precast concrete structural elements comprising pouring into a mold fine viscous paste cement mortar and gravel, vibrating the mold, and, during the process of pouring, maintaining the ratio of gravel to cement mortar such that the gravel will sink through the cement mortar so as to build up from the bottom of the mold a compact body of gravel substantially filling the mold.

3. A method of casting precast concrete structural elements comprising vibrating a mold and pouring into the mold from different sources of supply such quantities of fine viscous paste cement mortar and gravel and in such order that the gravel will sink through a layer of cement mortar and build up from the bottom of the mold a compact body of gravel substantially filling the mold, the gravel rising to a final level substantially in line with and only slightly below the level of the cement mortar.

4. A method of casting concrete structural elements comprising applying fine viscous paste cement mortar to a mold, and applying gravel to said mold substantially simultaneously with the application thereto of additional cement mortar and maintaining the ratio of cement mortar to stone pieces such that the level of cement mortar is always higher than that of the gravel, and vibrating the mold whereby the gravel sinks through and is lubricated by the cement mortar so as to build up from the bottom of the mold a compact body of gravel substantially filling the mold.

5. A method as claimed in claim 2, in which the gravel has an average size of about 17 to 33 millimeters.

6. A method as claimed in claim 2, in which the cement mortar contains a peptizing and fluidizing agent.

References Cited by the Examiner
UNITED STATES PATENTS

| | | | |
|---|---|---|---|
| 1,619,734 | 3/1927 | Jeppson et al. | 264—71 |
| 1,669,682 | 5/1928 | Straub | 264—308 |
| 2,295,155 | 9/1942 | Brown et al. | 264—240 |
| 2,378,252 | 6/1945 | Staehle et al. | 264—263 |
| 2,517,100 | 8/1950 | Erdle | 264—71 |

ROBERT F. WHITE, *Primary Examiner.*

ALEXANDER H. BRODMERKEL, *Examiner.*